Oct. 29, 1929.  E. E. HALL  1,733,371
SAFETY SHIELD FOR AUTOMOBILE WINDSHIELDS
Filed July 17, 1928
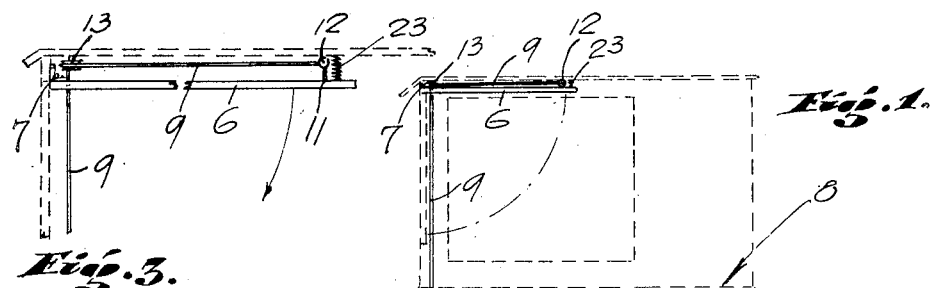
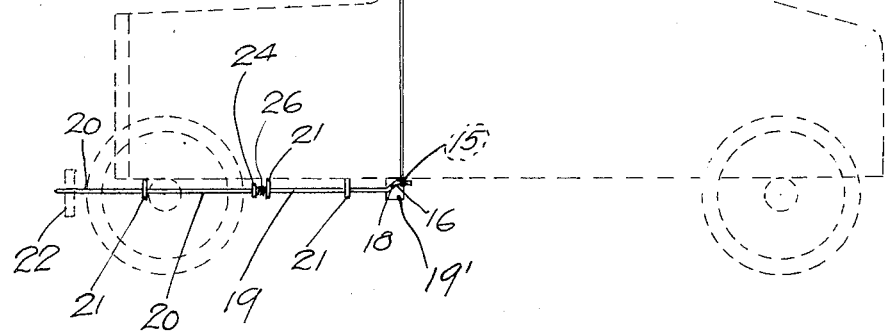
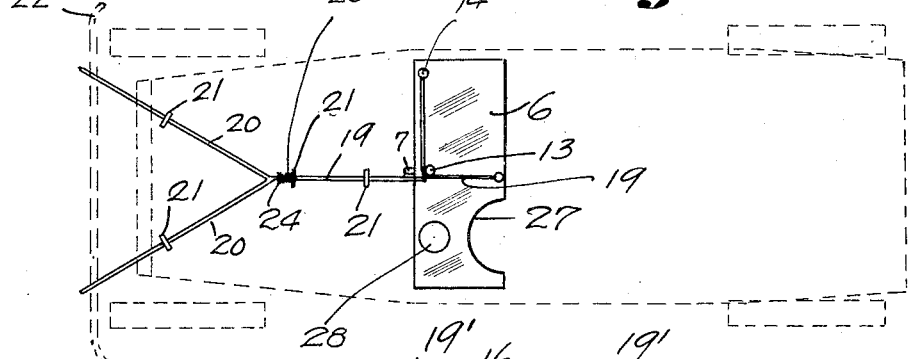
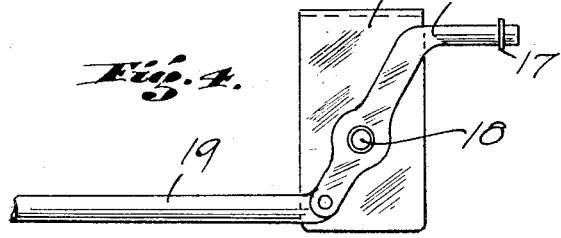
INVENTOR.
ERNEST E. HALL
BY Harry C. Schneder
ATTORNEYS.

Patented Oct. 29, 1929

1,733,371

UNITED STATES PATENT OFFICE

ERNEST E. HALL, OF PLEASANTON, CALIFORNIA

SAFETY SHIELD FOR AUTOMOBILE WINDSHIELDS

Application filed July 17, 1928. Serial No. 293,462.

The invention forming the subject matter of this application relates to a safety device for preventing injury to the occupants of an automobile by flying glass in the event of an automobile accident.

In case of an automobile accident, most frequently the windshield of the automobile breaks and the broken glass flying therefrom causes more or less serious injury to the occupants.

The primary object of the present invention is the provision of a protective shield which automatically descends between the windshield and the driver of the vehicle in the event of an automobile accident. A further object of the invention is the provision of a safety protecting shield which is normally supported in an out-of-way position below the top of an automobile, the actuating means of the shield being extended beyond the bumper and are actuated by the impact of the bumper with another object. The impact releases said operating means so as to allow the automatic swinging of the protecting shield between the windshield and the driver, thereby preventing injury to the occupants of the vehicle.

A still further object of the invention is the provision of a protecting shield and means for maintaining the shield in an out-of-way position, said means extending in front of the automobile bumper and being adapted to be released by the impact of the bumper with another object; resilient means being provided to instantaneously turn the protecting shield so as to assume a position between the windshield and the occupants of the vehicle for protecting the occupants from injury.

With the above mentioned objects and other objects in view, the invention consists in the novel construction and combination of parts hereinafter described, illustrated in the accompanying drawing, and set forth in the claims hereto appended, it being understood that various changes in the form, proportion, size, and minor details of construction within the scope of the claims, may be resorted to without departing from the spirit, or without sacrificing any of the advantages of the invention.

In the drawing—Figure 1 is a side elevation of the safety device, showing the same in the position as attached to an automobile, a diagrammatic view of the automobile being shown in dotted lines;

Figure 2 is a plan view of the device as attached to an automobile;

Figure 3 is an enlarged detail of the protecting shield, and the means for supporting and releasing the same on the top of the automobile;

Figure 4 is a detailed view of the protecting shield holding and releasing lever; and Figure 5 is a fragmentary view of the line showing the loop thereof engaged by the actuating lever.

In carrying out my invention, I make use of a protecting shield, designated by the numeral 6, which is pivotally secured as at 7 to the frame of an automobile, the latter being designated in its entirety by the numeral 8. The protective shield may be pivotally secured to any frame member of the automobile inside of the windshield, although in the case of closed cars, it is preferably pivotally secured upon the frame of the windshield as shown in Figures 1 and 3. For operating the protective shield, I employ a flexible line, such as a cord or cable, denoted by the numeral 9, an end of which is secured to the upper face of the protective shield 6 as at 11.

From the securing point 11, the cord passes thru a guiding pulley 12 which latter is secured in the top of the car, and the cord is guided thereby in parallelism with the top of the car to a second pulley 13 which is rotatable in a horizontal plane. From the pulley 13, the cord is stretched to another pulley 14, at the side of the automobile body, the latter pulley being rotatable in a vertical plane so as to allow the stretching of the cord 9 downwardly to a point below the body of the car 8 without obstructing the view of the driver. At this low point, a pulley 15 is rotatably supported below the body and is rotatable in a vertical plane so as to allow the change of direction of the cord from the side of the car to the center of the car below the body thereof. After the cord 9 is directed into the horizontal direction toward the center of the car 8, it is held in position by means of a lever 16. At the free end of the cord 9 is formed a loop 17 which is adapted to engage the end of the lever 16. The lever 16 is pivotally supported as at 18 upon a bracket 19', the latter depending from the body of the car 8.

The arm of the lever below the pivotal point 18 has pivotally related thereto rod 19, as shown in Figure 4, the end of which is bifurcated so as to form two branches 20, extending and diverging from the rod 19. The rod 19 is slidably supported in brackets 21, which latter depend from the bottom of the car 8. The branches 20 are also guided in similar brackets 21, but the ends of the branches slidably extend thru a bumper 22 of the car 8. The branches 20 may be made of resilient material in order to flex when forced rearwardly of the car to avoid binding in brackets 21. The openings in the brackets 21 through which the branches 20 pass may be made of such a size as to allow for sufficient play of the branches in their rearward movement to avoid binding with the brackets.

A coil spring 23 is disposed between the top of the car and the end of the protective shield 6, secured to the top so as to bear against the top of the car and against said shield, tending to force the shield away from the top. Now, when the cord 9 is pulled so as to bring the shield 6 into position against the action of the spring 23, then the loop end 17 of the cord reaches the center of the car and is slipped upon the end of the lever 16 by which it is maintained in inoperative position against the action of the spring 23.

My device operates as follows: In the event of accident, the bumper collides with the bumper of another car or with any other object. The branches 20 are pressed by said object and are moved thereby, advancing the rod 19 against the action of the spring 26, thus turning the lever 16 around the pivot 18, whereby the end of the lever 16 is withdrawn from the loop 17. The cord, thus being released, the shield 6, by its own weight, swings around its pivot 7 into the position indicated in dash-and-dotted lines in Figure 1. The swinging movement is greatly accelerated by the action of the tension spring 23 forcing the protective shield 6 away from the top of the car.

It is apparent that upon the impact of the bumper of the car, the cord 9 is immediately released, thereby allowing the instantaneous swinging of the protective shield 6 between the windshield and the occupants of the vehicle, thereby preventing injury to said occupants from the flying glass of the broken windshield.

The protective shield 6 is cut away at one edge thereof, as at 27, so as to allow the same to clear the steering wheel in its downward and upward swinging movements. An aperture 28 is provided above the cutaway portion 27 in the shield 6 for allowing the driver to see therethru, even after the collision or accident has occurred.

In order to return the protective shield to its inoperative position, it is merely necessary to grasp the loop 17 and pull the cord 9, so that the same will swing the shield 6 upwardly and then pull the same in place against the action of the spring 23, by which time the loop 17 is in aligning position with the end of the lever 16. Now, by engaging the loop 17 with the end of the lever 16, the shield 6 is again maintained in inoperative position until a further impact forces the branches 20 and the rod 19 against the action of the spring 26 into cord-releasing position, as heretofore described.

It will be recognized that the vehicle body may be adapted for accommodating a safety shield of the roller type, thereby obviating the necessity of the pivotal connection and swinging movement of the safety shield. In this event, the safety shield may be rolled in the usual manner into the vehicle body, and after being released, it will be lowered by its own weight or by means of counterweights. The maintaining of the safety shield in an inoperative position and the tripping of the same by the action of the impact of a vehicle collision will be achieved substantially in the same manner as heretofore set forth.

I claim:

1. In a device of the character described, a safety shield supported above a windshield and adapted to be turned so as to cover the windshield; flexible means for pulling the safety shield into uncovering position; a lever pivoted on the vehicle; means on the free end of the flexible means for engaging said lever so as to be held thereby, thus preventing the release of the safety shield; an operating element extending to the front of the car for turning said lever when said element is moved by the force of a collision, said lever being so moved as to release the flexible means and allow the movement of the safety shield in a windshield covering position.

2. In a device of the character described, a safety shield pivotally supported adjacent to a windshield of a vehicle; resilient means for turning said safety shield in a windshield covering position; flexible means for turning the safety shield in uncovering position against the action of said resilient means; a pivoted member on the vehicle; the free end of the flexible means being so formed as to be engageable by said member when the safety shield is in the uncovering position; means extending to the front of the vehicle and actuated by the force of collision of the vehicle for withdrawing said member from the free end of the flexible means, thus allowing the action of said resilient means to turn the safety shield in a windshield-covering position.

3. In a device of the character described, a safety shield pivotally supported above a windshield of a vehicle; resilient means for turning the safety shield so as to cover the inside face of the windshield; a flexible line having an end thereof secured to an end of the safety shield and being adapted to exert a pull thereon for moving the safety shield into an inoperative position; a lever pivoted on the vehicle; the free end of the line being adapted to be engaged by the lever when the safety shield is pulled into its inoperative position; and means extending to the front of the vehicle and being actuated by the force of collision of the car for turning said lever so as to withdraw the same from the said free end of the flexible line, thereby allowing the turning of the safety shield over the inside face of the windshield.

4. In a device of the character described, a safety shield pivotally supported above a windshield of a vehicle; resilient means for turning the safety shield so as to cover the inside face of the windshield; a flexible line having an end thereof secured to an end of the safety shield and being adapted to exert a pull thereon for moving the safety shield into an inoperative position; a lever pivoted on the vehicle; the free end of the line being adapted to be engaged by the lever when the safety shield is pulled into its inoperative position; means extending to the front of the vehicle and being actuated by the force of collision of the car for turning said lever so as to withdraw the same from the said free end of the flexible line, thereby allowing the turning of the safety shield over the inside face of the windshield; and resilient means for normally maintaining said lever in a line engaging position.

5. A protective shield for an automobile windshield pivotally related to the frame of an automobile above and adjacent to the windshield thereof, a lever pivotally related to the automobile and below the windshield, an arm pivotally related at one of its ends to one end of the lever and extending beyond the front of the automobile at the other of its ends, and a cord attached to the protective shield at one of its ends for securing the protective shield in raised position, the other end of the cord being looped over the other of the ends of the lever.

6. A protective shield for automobile windshields being pivotally related to the frame of an automobile above and adjacent the top of the windshield thereof, means for securing the protective shield in substantial parallelism with the top of the automobile, spring means interposed between the protective shield and the top of the automobile, a lever pivotally secured below the bottom of the automobile upon a horizontal axis, a lever actuating rod secured at one of its ends to the lever, said rod forming two branches at the other of its ends which extend beyond the front of the automobile and means for securing the protective shield in alignment with the top of the automobile in automatically releasible relation to the lever.

7. A protective shield for automobile windshields comprising a member pivotally related to the top of an automobile and adjacent the windshield thereof in such manner as to cover the windshield when moved about its pivot by gravity, means for securing said member in raised position, a lever pivotally related to the automobile and below the bottom thereof and having a rearwardly extending arm for engaging the means for securing the member in raised position, a bar pivotally related to the lever and extending beyond the front of the automobile.

8. A protective shield for automobile windshields comprising a protective member pivotally related to the automobile at the top thereof and adjacent the windshield, a lever pivotally related to the automobile and below the bottom thereof, guide sheaves secured to the automobile body, a cord secured to the protective member on the side opposite the pivot thereof and passing over the sheaves and looped over one end of the lever, a bar pivotally related to the other end of the lever and extending beyond the front of the automobile and brackets for securing the bar to the bottom of the automobile.

In testimony whereof I affix my signature.
ERNEST E. HALL.